United States Patent Office 2,825,675
Patented Mar. 4, 1958

2,825,675

METHOD OF LAMINATING USING TRIPOLYMER CEMENTS AND ARTICLES MADE THEREFROM

Howard L. Wilson, Raritan Township, Union County, and Samuel B. Robison and Winthrope C. Smith, Westfield, N. J., assignors to Esso Research and Engineering Company, a corporation of Delaware No Drawing. Application February 1, 1952
Serial No. 269,574

9 Claims. (Cl. 154—139)

This invention pertains to novel tripolymers and preparation thereof, and to special uses of the tripolymers for bonding together dissimilar polymer compounds and to novel compositions especially adapted for use as bonding materials.

In a variety of operations to produce plastic, rubbery, and/or elastic type structures, it is frequently desirable to make one portion of the article from one kind of plastic or rubbery material, and the other portion from some other kind of plastic or rubbery substance; hence, it becomes necessary that these two different compositions should be firmly bonded to each other. It is of particularly great importance to bond together chemically dissimilar materials.

As a specific example of this type of bond between dissimilar rubbery materials, in the production of pneumatic tires containing more than one polymer type, it is necessary to form an adequate and firm bond between treads or sidewalls prepared from relatively low unsaturation isoolefin-multiolefin copolymers and the more highly unsaturated rubbery materials such as the diene-styrene copolymers, diene-nitrile copolymers, and natural rubber, and other unsaturated polymers and mixtures of such rubbery materials from which the carcass is prepared.

However, natural rubber, rubber substitutes, and the various synthetic rubbery materials differ so greatly in their chemical and physical properties and in their respective reactions to compounding, filling and vulcanizing agents and processes generally, that it is difficult to get dissimilar plastic and/or rubbery substances to adhere together in a union, joint, or weld. The adhesion may be negligible or the bond formed may be too weak to be useful.

Although many attempts have been made to prepare cements for this purpose from commercially available materials, the previously made cements or tie gums have always proved to be inadequate.

It has been customary to use interposed plies of mixtures of the respective rubber-like compounds which are to be plied or combined together, and some kinds of rubber are readily united in this way. However, mixtures of natural rubber with the isoolefin-diolefin interpolymer are of relatively low physical strength, and while such a mixed ply will serve for some purposes, the strength is undesirably low for other purposes, especially for the attaching of a low unsaturation, olefinic, synthetic polymer tread to a rubber tire carcass compounded from natural rubber or diene-styrene polymers or admixtures thereof.

The present invention uses a single cement containing novel tripolymers and can be satisfactorily employed as a tie gum to bond together unlike rubbery, plastic, or elastic materials. The new cement or tie gum is especially useful for bonding together layers or portions of natural rubber or highly unsaturated synthetic rubbers and an isoolefin-diolefin low-temperature interpolymer.

One synthetic rubber-like substance which has found wide commercial use is the low-unsaturation interpolymer of a major proportion of an isoolefin and a minor proportion of a diolefin, particularly isobutylene with a diolefin such as butadiene, isoprene, the pentadienes, the methyl pentadienes, or dimethyl butadiene, the interpolymer being prepared by mixing the isoolefin and diolefin at a low temperature, and polymerizing the mixture to produce polymers having Staudinger molecular weights in excess of 20,000 and molecular weights preferably ranging between 30,000 and 150,000. These may be made as described in U. S. Patent 2,356,128.

Other valuable synthetic rubber-like polymers are those of dienes such as butadiene, or butadiene with acrylonitrile or butadiene with styrene as are produced by emulsion polymerization. These polymers have Wijs iodine numbers ranging up to abuot 451 in contrast to the isoolefin-diolefin polymer above described which normally has a Wijs iodine number within the range of 1 to about 40 or 50.

These synthetic polymers as well as natural rubber can be cured by heating with sulfur, especially in the presence of specific organic accelerators which act as vulcanization aids. However, the conditions for curing the various polymers and rubbery materials differ a great deal. In particular, the rate of cure and curing temperature of the isoolefin-diolefin interpolymer differ widely from those of natural rubber, and from the emulsion polymerizates which more closely resemble natural rubber. Accordingly, the entire processes for the cure of these polymers, and for the vulcanization of rubber are quite different, and attempts to cause bodies of the respective materials to adhere by curing them in simple contact do not give useful bonds.

Sulfur bridges are formed during vulcanization. These may occur between molecules or between points of unsaturation in the same molecule. Natural rubber, for example, is considered as 100% unsaturated while isoolefin-diolefin copolymers have unsaturation of the order of 1.5%. A sulfur molecule would thus be more likely to form an intra- and/or inter-molecular linkage with natural rubber than cross-link between the natural rubber and copolymer molecules to form a stable bond. Furthermore, the solubility of sulfur is of the order of three times more in natural rubber than in isoolefin-diolefin copolymers.

Bonds are produced by the present invention by the application of a single compound cement to the dissimilar polymer and rubber compounds. The polymer used in the cement is a tripolymer of an isoolefin, specifically isobutylene, with butadiene and another diolefin, preferably a conjugated diolefin having from 5 to 8 carbon atoms, such as isoprene, piperylene, or dimethylbutadiene. Based on the amount of isobutylene, the butadiene in the feed used in making the tripolymer should be not less than 40 parts of butadiene by weight per 100 parts of isobutylene. The second diolefin should be present in not less than 5 parts by weight per 100 parts of isobutylene. The unsaturation as measured by the Wijs method (iodine number) should not be less than 40. The broad and preferred percentage ranges of the three components which can be used are shown in the following table. The percentages of butadiene and other diene are based on the amount of isobutylene used. The preferred diluent is 100 to 700 parts by weight of methyl chloride.

|  | Broad range | Preferred range |
|---|---|---|
| Isobutylene | 100 | 100 |
| Butadiene | 40-500 | 50-300 |
| Other diene | 5-50 | 10-30 |

A typical monomer composition for the preparation of the tripolymer composition is represented by the following:

|  | Parts by weight | Wt. percent composition of feed |
|---|---|---|
| Isobutylene | 100 | 55.5 |
| Butadiene | 50 | 27.8 |
| Isoprene | 30 | 16.7 |

The polymerization of these monomer mixtures is carried out by the application thereto of a Friedel-Crafts catalyst in solution while maintaining the reactive mixture at a temperature of from 0° C. to —164° C.

The procedure for preparing the tripolymer consists in preparing a suitable mixture of an isoolefin such as isobutylene with butadiene and with another diolefin; suitable diolefins being isoprene, the pentadienes, dimethylbutadiene, cyclopentadiene or other conjugated diolefins. The mixture of olefins is then cooled to a relatively low temperature preferably below 0° C., and preferably by the application to the mixture of a refrigerant such as solid carbon dioxide, or liquid ethylene (which is the preferred refrigerant), or such other diluent-refrigerants as liquid methane, especially in admixture with liquid propane or liquid ethane, or external cooling may be used. In addition, various diluents may be used such as butane, ethyl or methyl chloride and the like. To this mixture of olefins and diluent-refrigerant, there is then added a solution of a Friedel-Crafts catalyst such as an active halide catalyst, for example, aluminum chloride, aluminum bromide, zirconium chloride, boron fluoride, titanium chloride, or uranium chloride dissolved in an inert, low-freezing solvent such as a lower hydrocarbon or an alkyl halide as ethyl or methyl chloride or carbon disulfide or other similar low-freezing, non-complex forming solvent. The catalyst solution is preferably applied to the rapidly stirred olefin-containing mixture, in finely dispersed form. The polymerization proceeds rapidly to yield a slurry or mass of the tripolymer in the residual diluent-refrigerant and unreacted monomers.

The polymerization reaction is preferably continued until from 10% to 70% of the total monomer reactants present have reacted. When this stage of reaction is reached, the reaction is desirably quenched by mixing the polymerization reaction mixture with a combined oxygen-containing substance such as an alcohol, a ketone or an acid, or an alkaline agent such as caustic or carbonate solution or ammonia or other similar quenching agent. The polymer is then brought up to room temperature and in so doing, the diluent, the refrigerant, the catalyst solvent, and the unreacted olefins are volatilized and any decomposition products of the active metal halide catalyst substance are removed by washing. The polymer is then isolated and dried, and is ready for the next step of the present invention.

The novel cements are then made up by compounding the tripolymer into both sulfur and non-sulfur-containing recipes using a rubber mill for the blending operations. In formulating these cements, the following recipes are typical and were tested and found to be satisfactory for bonding isoolefin-diolefin copolymers to natural rubber and to butadiene-styrene copolymers as well as to mixtures thereof. Variations in the components of the recipes are possible, and in some cases, may be desirable to achieve optimum results.

CEMENT RECIPES

|  | Cement (parts by weight) | | |
|---|---|---|---|
|  | A | B | C |
| Polymer (isobutylene-butadiene-diolefin tripolymer) | 100 | 100 | 100 |
| Zinc oxide | 5 | 5 | 5 |
| Carbon black | 50 | 50 | 50 |
| Sulfur | 5 |  |  |
| Tetramethylthiuram disulfide | 3 |  |  |
| p,p'-Dibenzo quinone dioxime |  | 6 |  |
| p Quinone dioxime |  |  | 4 |
| Red lead oxide |  | 10 | 10 |

The compounded recipes can then be mixed with a solvent if desired which may be any solvent capable of dissolving or dispersing the rubbery tripolymer but which possesses some volatility properties. The straight chain and branched chain paraffin hydrocarbons have been found to be especially useful as solvents. Or a solvent such as benzene, toluene, petroleum naphtha or suitable chlorinated hydrocarbons may be used. Hexane is a good solvent which may be employed for preparing the cements of this invention. If other materials are used in the compounding recipe, such inorganic materials as zinc oxide and carbon black may be insoluble. In any case, a solution or a dispersion may be prepared and used. A mixture containing about 6 to 15% by weight of solids can be prepared. A cement with hexane as a solvent and having about 10% solids is preferred.

The rubber and copolymer formulations used in the preparation of adhesion test specimens are shown below. The isobutylene-isoprene copolymer was prepared by the generally known methods for making such copolymers and especially by the procedures as shown in U. S. Patent 2,356,128 to Thomas and Sparks using about 3 weight percent of isoprene in the polymerization feed. The procedure for making the butadiene-styrene copolymer rubber (GR-S) is well known to the art.

FORMULATIONS EMPLOYED IN ADHESION TESTING

|  | Adhesion pads (parts by weight) | | | |
|---|---|---|---|---|
|  | Isobutylene-isoprene copolymer | Butadiene-styrene copolymer | Natural rubber (smoked sheet) | Natural rubber butadiene-styrene copolymer blend [1] |
| Polymer | 100 | 100 | 100 | 100 |
| Zinc oxide | 5 | 5 | 5 | 5 |
| (SRF) carbon black | 15 | 20 | 40 | 20 |
| Stearic acid |  |  | 1 |  |
| Furnace black (fine particle) | 35 | 25 |  | 20 |
| Sulfur | 2 | 3 | 2.8 | 3 |
| Tetramethylthiuram disulfide | 1 |  |  |  |
| 2,2-benzothiazyl disulfide |  | 1 | 0.7 | 1 |
| Petroleum softener | 3 | 5 |  | 3 |
| Tellurium dithiocarbamate | 1 |  |  |  |
| Phenyl beta-naphthylamine |  | 1 |  | 1 |
| Pine tar |  |  | 3 |  |

[1] A blend of 2 parts copolymer to 1 part natural rubber smoked sheet by weight.

The adhesion test samples were prepared by applying the same test cements to the surfaces of two calendered pads 4 x 6 x .075 inch. Following drying of the cements, two calendered surfaces were joined and the adhesion sample rolled under light pressure to facilitate the removal of air. The specimens were then backed with a light cotton duck and vulcanized with a low mold pressure. The test specimens were cured for 30 minutes at 300° F. One inch wide test strips were cut from the 4 x 6 x .150 inch adhesion pads and pulled on the Scott tensile tester at 2 inches per minute jaw separation rate.

The invention will be more completely described by the following examples which are presented as representative embodiments of the invention but not with the intention of any limitation thereto.

Example 1

A tripolymer was prepared by the copolymerization of an olefinic mixture containing 100 parts of isobutylene, 20 parts of isoprene, and 150 parts of butadiene (all parts by weight) and about 615 parts by weight of methyl chloride as a diluent. The reaction was carried out in a small size, ethylene jacketed batch polymerization reactor. The copolymerization was carried out at a temperature of about —100° C. The catalyst used consisted of 0.37 gram of aluminum chloride dissolved per 100 cc. of methyl chloride which catalyst showed an efficiency of 68 grams of polymer produced per gram of catalyst used. A conversion of 13.6% of total reactants was reached. The reaction mixture was dumped into hot water. The polymer was hot milled to remove the last traces of unreacted monomers and water. The iodine number by the Wijs method was 54.9. The 1½ minute Mooney viscosity @ 212° F. was 47 and the 8 minute value was 39. The polymer was made up into a cement in a hexane solution using both sulfur and non-sulfur compounding for the polymer.

The cement was found to give bond strengths of greater than 15 lbs. per linear inch when used to adhere dissimilar polymers. The polymers used in the adherence tests were low unsaturation isobutylene-isoprene copolymer, pads of which were joined to natural rubber, butadiene-styrene copolymer, and blends of these two highly unsaturated rubbers.

Example 2

A series of tripolymers was made up in a manner similar to that described in Example 1. The data on the preparation of these polymers and on their properties are shown in Table I.

Example 3

The tripolymers described in Example 2 were made up into a number of cements according to formulations A, B and C shown above. Table II shows the results of adhesion tests carried out on pads of isobutylene and isoprene copolymer bonded to natural rubber and butadiene-styrene copolymer blend. The blend contained about one-third natural rubber and two-thirds copolymer. These data indicate that the above tripolymers give satisfactory results when used in these types of cement.

TABLE II.—ADHESION OF ISOBUTYLENE-ISOPRENE COPOLYMER TO NATURAL RUBBER AND BUTADIENE-STYRENE COPOLYMER BLEND USING TRIPOLYMER CEMENTS

| Polymer No. | Adhesion (pounds per linear inch) | | |
|---|---|---|---|
| | Recipe A | Recipe B | Recipe C |
| 1 | 16 | 10 | 7 |
| 2 | 12 | 14 | 22 |
| 3 | 12 | 7 | |
| 4 | 12 | 9 | |

Example 4

The tripolymers of Example 2 were also tested in cements for bonding pads of butadiene-styrene copolymer to pads of isobutylene-isoprene copolymer. Again, excellent results are shown by the data.

TABLE III.—ADHESION OF BUTADIENE-STYRENE COPOLYMER TO ISOBUTYLENE-ISOPRENE COPOLYMER USING TRIPOLYMER CEMENTS

| Polymer No. | Adhesion (pounds per linear inch) | | |
|---|---|---|---|
| | Recipe A | Recipe B | Recipe C |
| 1 | 16 | 19 | 46 |
| 2 | 17 | 15 | 19 |
| 3 | 12 | 10 | 13 |
| 4 | 16 | 16 | 19 |
| 5 | 12 | | 17 |
| 6 | 23 | | 38 |

Example 5

Cements were made up from Polymers 1 and 2 using different amounts of curatives in the recipes as shown below. The cements contained 12.5 g. compound/175 cc. of hexane (light naphtha). The specimens tested were cured 30 minutes at 300° F.

TABLE I.—PREPARATION OF TRIPOLYMERS

| Polymer run No. | Feed (parts by weight) | | | | | | Catalyst, AlCl$_3$ in methyl chloride | | Percent conv. of total reactants | Percent gel in cyclohexane | Iodine No. Wijs method | Mooney viscosity 1½'-8' at 212° F. |
|---|---|---|---|---|---|---|---|---|---|---|---|---|
| | Methyl chloride diluent | Isobutylene | Isoprene | Dimethylbutadiene | Piperylene | Butadiene | Conc., g./100 cc. | Eff., g. polymer/g. catalyst | | | | |
| 1 | 615 | 100 | 20 | | | 150 | 0.37 | 68 | 13.6 | 69.9 | 54.9 | 47–39 |
| 2 | 440 | 100 | 30 | | | 50 | 0.46 | 90 | 29.5 | 55.1 | 49.2 | 57–53 |
| 3 | 440 | 100 | 10 | | | 100 | 0.46 | 111 | 24.0 | 5.7 | 72.0 | 65–62 |
| 4 | 310 | 100 | 10 | | | 300 | 0.49 | 92 | 25.3 | 84.3 | 57.2 | 81–71 |
| 5 | 150 | 100 | | | 20 | 150 | 0.43 | 202 | 20.5 | 61.4 | 40 | 34–28 |
| 6 | 150 | 100 | | 20 | | 150 | 0.43 | 92 | 20.3 | 73.0 | 45.7 | 83–75 |

|  | Parts by weight | | | |
|---|---|---|---|---|
| Polymer No. | 1 | | 2 | |
| Polymer | 100 | 100 | 100 | 100 |
| Zinc oxide | 5 | 5 | 5 | 5 |
| Carbon black | 50 | 50 | 50 | 50 |
| Sulfur | 2.0 | | 2.0 | |
| Tetramethylthiuram disulfide | 0.1 | | 0.1 | |
| p-Quinone dioxime | | 2.0 | | 2.0 |
| Benzothiazyl disulfide | 1.0 | | 1.0 | |
| Red lead oxide | | 10.0 | | 10.0 |
| Adhesion, pounds/linear inch [1] | 28 | 40 | 20 | 33 |

[1] 2 inch-per-minute separation rate.

Example 6

The use of this invention makes possible the construction of a pneumatic tire by bonding together rubbery materials of high and low levels of chemical unsaturation. The tire carcass may be prepared in conventional manner by impregnating and/or calendering natural or synthetic fibers, or even metal wire, with high unsaturation rubbers containing normal constituents such as sulfur, vulcanizing accelerators, fillers, reclaimed rubber, softeners, etc. To this carcass or cushion is applied a tie gum or cement prepared from a tripolymer as described in Examples 1 and 2.

The tread and sidewall can be prepared for tire building by extrusion or calendering operations according to techniques well known in the art from a low unsaturation rubber prepared predominantly from isobutylene and a conjugated diolefin such as isoprene or butadiene, also containing normal constituents, curatives, softener, filler, etc. The surface of the isobutylene-diolefin copolymer which contact the cushion or tire casing prepared using high diolefin rubber may be coated with the tripolymer cement prior to assembly. The tires may then be vulcanized in customary manner.

Example 7

Alternatively the invention may be utilized for the application to various structures having jackets made up of the low unsaturation isobutylene-diolefin copolymer material which is highly resistant to oxidation by ozone, air or other reactants and highly resistant to sunlight, ultraviolet light and heat, as well as highly resistant to flexure, abrasion, and other mechanically destructive influences. Articles in which this type of structure is particularly advantageous are pneumatic tires as above described; cables in which an insulation of natural rubber, either new or reclaimed, is protected by a jacket of the copolymer held in place by an intervening layer of the tripolymer tie gum; belts either for the transmission of power or conveyor belts, in which a fabric carcass impregenated with rubber is protected by a jacket of polymer in which instance the combination is particularly advantageous because of the high strength and high abrasion resistance of the polymer.

What is claimed is:

1. An article of manufacture comprising a body of a low temperature interpolymer of a major amount of isobutylene with a minor proportion of a conjugated diolefin, the interpolymer being characterized by a low unsaturation within the range of an iodine number between 0.5 and 40, a molecular weight above 20,000 and reactivity with a curing agent to yield an elastic product; a second body of a rubbery material, characterized by a high unsaturation within the range of an iodine number between that of butadiene-styrene copolymer rubber and 451, and reactivity with a curing agent; and a third, interposed body comprising a tripolymer of interpolymerized isobutylene, butadiene, and an aliphatic conjugated diolefin of 5 to 8 carbon atoms, said tripolymer having a Wijs iodine number of at least 40 and an 8-minute Mooney at 212° F. of about 28 to 75.

2. An article of manufacture according to claim 1 in which the second body is a diene-styrene interpolymer.

3. An article of manufacture according to claim 1 in which the second body is natural rubber.

4. An article of manufacture according to claim 1 in which the second body is a blend of a diene-styrene interpolymer and natural rubber.

5. An article of manufacture according to claim 1 in which the interposed, third body comprises a tripolymer of interpolymerized isobutylene, butadiene and isoprene.

6. An article of manufacture comprising a triply laminated structure, one of said laminae comprising a synthetic, solid interpolymer of a major proportion of isobutylene and a minor proportion of a conjugated diolefin, the interpolymer being characterized by an iodine number of about 1 to 40, a molecular weight above 20,000, and reactivity with a curing agent to yield an elastic product; a second lamina of a rubbery material, characterized by a high unsaturation within the range between the iodine number of butadiene-styrene copolymer rubber and 451, and reactivity with a curing agent; and a third, interposed, lamina comprising a tripolymer of interpolymerized isobutylene, butadiene and an aliphatic conjugated diolefin of 5 to 8 carbon atoms, said tripolymer having a Wijs iodine number of about 40 to 72 and an 8-minute Mooney at 212° F. of about 28 to 75, and said triply laminated structure showing a Scott adhesion greater than 15 pounds per linear inch, when pulled at 2 inches per minute jaw separation rate.

7. The method of uniting a solid isoolefin-diolefin interpolymer material, prepared by reacting together a major proportion of isobutylene and a minor proportion of a conjugated diolefin having from 5 to 8 carbon atoms, in the presence of a dissolved Friedel-Crafts catalyst, at a temperature between −40° C. and −160° C., said interpolymer having an iodine number of about 1 to 40, and a molecular weight greater than 20,000, to a high unsaturation, rubbery material having an iodine number between that of butadiene-styrene copolymer rubber and 451, which comprises interposing between the said two materials a layer comprising a tripolymer of isobutylene, butadiene, and isoprene, said tripolymer having been made by Friedel-Crafts polymerization of 100 parts by weight of isobutylene, about 40 to 500 parts by weight of butadiene and about 5 to 50 parts by weight of isoprene, each of said three kinds of rubbery materials having been compounded with curing agents, and subjecting the composite article to vulcanizing conditions.

8. The method according to claim 7 in which the high unsaturation rubbery material is a diene-styrene interpolymer.

9. A flexible, elastic structure comprising a body of cured, low unsaturation isobutylene-diolefin interpolymer of about 1 to 40 iodine number, and a body of cured, high unsaturation rubbery material having an iodine number at least as high as that of butadiene-styrene coplymer rubber, with a body of cured, tripolymer composition having an iodine number of about 40 to 72 comprising interpolymerized isobutylene, butadiene and isoprene interposed between the said two bodies, the adhesion between said two bodies being greater than 15 pounds per linear inch as measured on the Scott tester when pulled at a 2-inches per minute jaw separation rate.

References Cited in the file of this patent

UNITED STATES PATENTS

| 2,322,073 | Thomas et al. | June 15, 1943 |
| 2,467,322 | Lightbown et al. | Apr. 12, 1949 |
| 2,471,905 | Smith | May 31, 1949 |
| 2,521,359 | Garber | Sept. 5, 1950 |
| 2,522,138 | Schaffer | Sept. 12, 1950 |
| 2,529,520 | Sparks et al. | Nov. 14, 1950 |
| 2,581,154 | Walsh et al. | Jan. 1, 1952 |
| 2,631,953 | Hubbard et al. | Mar. 17, 1953 |